United States Patent
Chuang

(10) Patent No.: US 8,855,701 B2
(45) Date of Patent: Oct. 7, 2014

(54) DYNAMIC TRANSMISSION POWER CONTROL METHOD

(75) Inventor: Dong-Ming Chuang, Hsinchu County (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 391 days.

(21) Appl. No.: 13/398,854

(22) Filed: Feb. 17, 2012

(65) Prior Publication Data

US 2012/0258761 A1 Oct. 11, 2012

Related U.S. Application Data

(60) Provisional application No. 61/474,244, filed on Apr. 11, 2011, provisional application No. 61/509,582, filed on Jul. 20, 2011.

(51) Int. Cl.
H04B 7/00 (2006.01)
H04W 52/32 (2009.01)

(52) U.S. Cl.
CPC .................................. H04W 52/327 (2013.01)
USPC ........ 455/522; 455/402; 455/422.1; 370/336; 370/431; 370/482

(58) Field of Classification Search
USPC ........... 455/522, 402, 422; 370/336, 431, 482
See application file for complete search history.

(56) References Cited

U.S. PATENT DOCUMENTS

| | | | |
|---|---|---|---|
| 7,885,228 B2 | 2/2011 | Walton | |
| 8,140,049 B2 * | 3/2012 | Schwager et al. | 700/9 |
| 2007/0002772 A1 | 1/2007 | Berkman | |
| 2008/0260010 A1 | 10/2008 | Schwager | |
| 2009/0161784 A1 | 6/2009 | Stadelmeier | |
| 2009/0310572 A1 * | 12/2009 | Wang et al. | 370/336 |
| 2010/0265895 A1 * | 10/2010 | Bracha | 370/329 |

\* cited by examiner

Primary Examiner — Sanh Phu
(74) Attorney, Agent, or Firm — Winston Hsu; Scott Margo

(57) ABSTRACT

The present invention discloses a dynamic transmission power control method for a transmitter of a communication system which comprises the transmitter and a plurality of receivers. The transmitter is coupled to the plurality of receivers via a plurality of corresponding outgoing links. The transmission power control method comprising collecting a plurality of suggested transmission power back-off levels for the plurality of outgoing links to the plurality of receivers and/or and a plurality of channel characteristics corresponding to the plurality of outgoing links from the plurality of receivers; and determining an allowable transmission power back-off level for a desirable receiver among the plurality of receivers according to the plurality of suggested transmission power back-off levels and the plurality of channel characteristics.

9 Claims, 7 Drawing Sheets

DYNAMIC TRANSMISSION POWER CONTROL METHOD

CROSS REFERENCE TO RELATED APPLICATIONS

This application claims the benefit of U.S. Provisional Application No. 61/474,244, filed on Apr. 11, 2011 and entitled "Power Back-off Scheme for a Communication System", and U.S. Provisional Application No. 61/509,582, filed on Jul. 20, 2011 and entitled "Optimal Transmit Power Cutback Method for a Power-Line Communication System", the contents of which are incorporated herein by reference.

BACKGROUND

The present invention relates to a dynamic transmission power control method, and more particularly, to a dynamic transmission power control method for a transmitter of a powerline communication system capable of generating an optimal power cutback level for each receiver, to effectively maximize throughput and increase power efficiency without inducing hidden-node issue.

Transmission power back-off technology has been proposed to either increase throughput or reduce power consumption or electromagnetic radiation. However, determining the transmission power back-off level has been a challenge in communication systems that could suffer from the hidden-node problem.

Specifically, since the signal to noise ratio (SNR) dynamic range of an Analog-to-Digital (A/D) converter at a receiver is limited, the transmission power spectral density (PSD) adjustment, the aggregate transmission power adjustment or the gain scaling adjustment will generate better SNR at receiving side at some parts of subcarriers. Accordingly, receiver's throughput will be increased.

For example, please refer to FIG. 1A to FIG. 1B. FIG. 1A is a schematic diagram of a non-flat transmit PSD mask of a powerline communication (PLC) system, wherein PSD masks corresponding to different frequency bands are −55, −85 and −120 dBm/Hz, respectively. FIG. 1B is a schematic diagram of SNR of signals received by a receiver of the PLC system when utilizing the non-flat transmit PSD mask shown in FIG. 1A. As shown in FIG. 1A, in order to comply with the regulation of a country, the transmit PSD mask of the PLC system may not be flat, and the PSD mask for some active subcarriers could be lower than that for the other active subcarriers, e.g. the PSD mask of a high frequency band is lower than the PSD mask of a low frequency band. In certain cases without transmit PSD adjustment as shown in FIG. 1A, an analog automatic gain control (AGC) setting on the receiver can not drive the channel noise above the quantization noise level of an A/D converter for all frequency tones due to limited dynamic range of the converter, and thus those subcarriers with lower reference PSD have lower SNR as shown in FIG. 1B (lower than 25 dB). In other words, since signals in the low frequency band have high transmission power and thus the AGC can only provide a low gain to prevent saturation of the A/D converter, signals in the high frequency band with low transmission power can not be amplified by the AGC with a high gain and thus have low SNR.

On the other hand, please refer to FIG. 1C and FIG. 1D. FIG. 1C is a schematic diagram of a non-flat transmit PSD mask of the PLC system applied with low-band transmission power back-off, wherein PSD masks corresponding to different frequency bands are −65, −85 and −120 dBm/Hz, respectively. FIG. 1D is a schematic diagram of SNR of signals received by the receiver of the PLC system when utilizing the non-flat transmit PSD mask shown in FIG. 1C. As shown in FIG. 1C, if low-band transmission power back-off is applied (10 dBm lower), SNRs of those subcarriers with lower reference PSD masks can be improved significantly (10 dB higher) In other words, if transmission power of signals in the low frequency band is reduced, the AGC can provide higher gain without saturation of the A/D converter, and thus signals in the high frequency band can have higher SNR.

As can be seen from the above, the transmitter needs to know a power back-off level that maximizes the benefit of transmission power back-off. However, careless transmission power back-off may result in the hidden-node problem that an on-going packet may be interfered by some distant nodes which cannot hear the signal from the packet transmitter since transmission power of the signal from the packet transmitter is reduced too much for the distant node to hear due to path loss.

For example, please refer to FIG. 1E, which is a schematic diagram of a basic service set (BBS) 10 of a PLC network. As shown in FIG. 2, the BBS 10 includes a BSS manager BM1 and stations A-D, wherein the stations A-D are all associated with the BSS manager BM1 (also a station). Under such a configuration, when the station A transmits packets to the station B, a "hidden node" issue may occur, i.e. some stations (e.g, the station C, D, or the BSS manager BM1) in the BSS 10 may be not aware that the station A is transmitting packets to the station B since the station A performs a careless transmission power back-off and the station C, D, or the BSS manager BM1 can not detect the packets transmitted from the station A to the station B.

Therefore, since careless transmission power back-off may result in the hidden-node problem that an on-going packet may be interfered by some distant nodes which can not hear the signal from the packet transmitter, there is a need to improve over those prior arts.

SUMMARY

It is therefore an object of the present invention to provide a dynamic transmission power control method for a transmitter of a communication system capable of generating an optimal power cutback level for each receiver, to effectively maximize throughput and increase power efficiency without inducing hidden-node issue.

The present discloses a dynamic transmission power control method for a transmitter of a communication system which comprises the transmitter and a plurality of receivers. The transmitter is coupled to the plurality of receivers via a plurality of corresponding outgoing links. The transmission power control method comprising collecting a plurality of suggested transmission power back-off levels for the plurality of outgoing links to the plurality of receivers and/or a plurality of channel characteristics corresponding to the plurality of outgoing links from the plurality of receivers; and determining an allowable transmission power back-off level for a desirable receiver among the plurality of receivers according to the plurality of suggested transmission power back-off levels and the plurality of channel characteristics.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
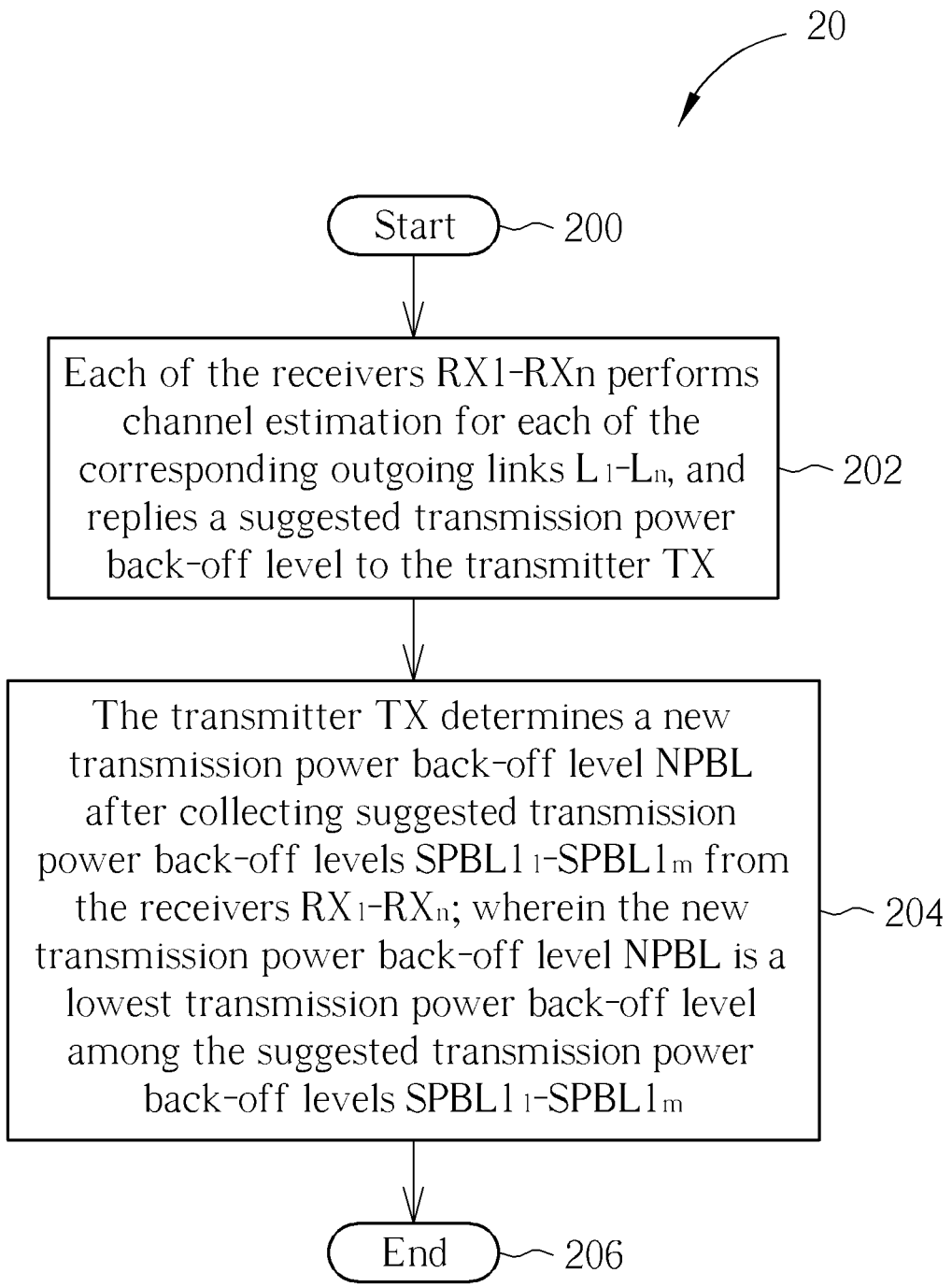
FIG. 2 is a schematic diagram of a transmission power control process for a communication system.

Please refer to FIG. 2, which is a schematic diagram of a transmission power control process 20 for a communication system. The communication system is preferably a powerline communication (PLC) system, and includes a plurality of stations, e.g. the communication system is the basic service set (BBS) and the plurality of stations are the BSS manager BM1 and the stations A-D shown in FIG. 2. Each station in turn acts as a transmitter TX and one of receivers $RX_1$-$RX_n$ since only one station can transmit data in the PLC system at a time. The transmitter TX is coupled to the receivers $RX_1$-$RX_n$ via corresponding outgoing links $L_1$-$L_n$. The transmission power control process 20 includes the following steps:

Step 200: Start.

Step 202: Each of the receivers $RX_1$-$RX_n$ performs channel estimation for each of the corresponding outgoing links $L_1$-$L_n$, and replies a suggested transmission power back-off level $SPBL1_n$ to the transmitter TX.

Step 204: The transmitter TX determines a new transmission power back-off level NPBL after collecting suggested transmission power back-off levels $SPBL1_1$-$SPBL1_m$ from the receivers $RX_1$-$RX_n$; wherein the new transmission power back-off level NPBL is the lowest transmission power back-off level among the suggested transmission power back-off levels $SPBL1_1$-$SPBL1_m$.

Step 206: End.

According to the transmission power control process 20, a receiver $RX_a$ of the receivers $RX_1$-$RX_n$ performs channel estimation for a corresponding outgoing links $L_a$ of the corresponding outgoing links $L_1$-$L_n$, and replies channel characteristics $CC1_a$ of the outgoing link $L_a$, comprising a suggested transmission power back-off level $SPBL1_a$ which maximizes power efficiency on the outgoing links $L_a$, to the transmitter TX. Then, the transmitter TX can determine a new transmission power back-off level NPBL after collecting channel characteristics of the outgoing links $L_1$-$L_n$, comprising suggested transmission power back-off levels $SPBL1_1$-$SPBL1_m$, from the receivers $RX_1$-$RX_n$, wherein the new transmission power back-off level NPBL is the lowest transmission power back-off level among the suggested transmission power back-off levels $SPBL1_1$-$SPBL1_m$. Under such a situation, since the new transmission power back-off level NPBL is the lowest transmission power back-off level among the suggested transmission power back-off levels $SPBL1_1$-$SPBL1_m$ collected from the receivers $RX_1$-$RX_n$, the transmitter TX can utilize the new transmission power back-off level NPBL and corresponding tone maps NTM for continuing transmission such that all the receivers $RX_1$-$RX_n$ can hear transmitted packets. As a result, the present invention can maximize the benefit of transmission power back-off to increase power efficiency and data rate while avoiding hidden-node problem by considering path losses of all the outgoing links $L_1$-$L_n$ from the transmitter TX.

Noticeable, the new transmission power back-off level NPBL for an outgoing link can be per tone (a specific frequency), per band (for a set of tones), or identical for a complete band since the benefit of transmission power back-off can be achieved by reducing transmission power only on some tones under some circumstances, e.g. the receiver $RX_a$ determines power of received sounding packets is high only on a specific frequency or a range of tones after channel attenuation, or transmission power reduction of low band (<30 MHz) in the PLC system.

In detail, the transmitter TX initiates a sounding procedure $SP_1$ according to a current transmission power back-off level CPBL to send sound packets $SPT_1$ to the receiver $RX_a$ first, and then the receiver $RX_a$ estimates the channel characteristics $CC1_a$, comprising tone maps CTM for the current transmission power back-off level CPBL and the suggested transmission power back-off level $SPBL1_a$, and replies the transmitter TX with the channel characteristics $CC1_a$. Noticeably, if the sounding procedure $SP_1$ is a first round of the sounding procedure initiated by the transmitter TX for channel estimation, the current transmission power back-off level CPBL is zero, i.e. the transmitter TX initiates the sounding procedure $SP_1$ with full transmission power, according to regulation, to send the sound packets $SP_1$ to the receiver $RX_a$.

Then, in order to get sufficient channel information for determining the new transmission power back-off level NPBL while avoiding the hidden node problem, suggested transmission power back-off levels $SPBL1_1$-$SPBL1_m$ collected by the transmitter TX for determination is preferably suggested transmission power back-off levels $SPBL1_1$-$SPBL1_n$ of all of the outgoing links $L_1$-$L_n$, but can be suggested transmission power back-off levels of a portion of the outgoing links $L_1$-$L_n$ collected within a time limit, or suggested transmission power back-off levels of a portion of the outgoing links $L_1$-$L_n$ exceeding some threshold as well.

Afterwards, the transmitter TX can initiate a sounding procedure $SP_2$ according to the new transmission power back-off level NPBL to send sound packets $SPT_2$ to the receiver $RX_a$ if the new transmission power back-off level NPBL is different from the current transmission power back-off level CPBL, and then the receiver $RX_a$ estimates channel characteristics $CC2_a$, comprising the tone maps NTM for the new transmission power back-off level NPBL and optionally a suggested transmission power back-off level $SPBL2_a$, and replies the transmitter TX with the channel characteristics $CC2_a$. Thus, the transmitter TX can utilize the new transmission power back-off level NPBL and the corresponding tone maps NTM for continuing transmission.

Noticeably, if the suggested transmission power back-off level $SPBL2_a$ is different from the new transmission power back-off level NPBL, e.g. a noise undetected by the receiver $RX_a$ when utilizing full transmission power (an automatic gain control provides a lower gain) is detected by the receiver $RX_a$ when utilizing the new transmission power back-off level NPBL (the automatic gain control provides a higher gain) and the receiver $RX_a$ suggests the suggested transmission power back-off level $SPBL2_a$ higher than the new transmission power back-off level NPBL, the transmitter TX reinitiates another round of sounding procedure to determine the new transmission power back-off level NPBL again according to the suggested transmission power back-off level SPBL$2_a$ and the suggested transmission power back-off levels SPBL$1_1$-SPBL$1_m$.

Under such a situation, channel characteristics are incrementally collected by all stations (each acting as the transmitter TX in turn) using existing sounding procedures. All the stations can maintain a database of the channel characteristics estimated by the corresponding receivers RX$_1$-RX$_n$ of outgoing link $L_1$-$L_n$. The new transmission power back-off level NPBL is determined so that the transmitted signal can be heard by all receivers RX$_1$-RX$_n$. Noticeably, when a new station joins the communication system, each station acts as the transmitter TX to initiate a sounding procedure with the new station which acts as a new receiver to adjust the new transmission power back-off level NPBL. (The new station starts with an empty database of channel characteristics.) The receivers RX$_1$-RX$_n$ of the link partners estimate the channel property and feed that information back to the transmitters TX. The transmitters TX collect the channel characteristics and determine another new transmission power back-off level NPBL that can be perceived by all receivers RX$_1$-RX$_n$, including the new station acting as a receiver. The new station also acts as the transmitter TX to collect the channel characteristics and finally determines the new transmission power back-off level NPBL for itself. As a result, the present invention can maximize the benefit of transmission power back-off to increase power efficiency and data rate while avoiding hidden-node problem by considering path losses of all the outgoing links $L_1$-$L_n$ from the transmitter TX.

Figure 3:
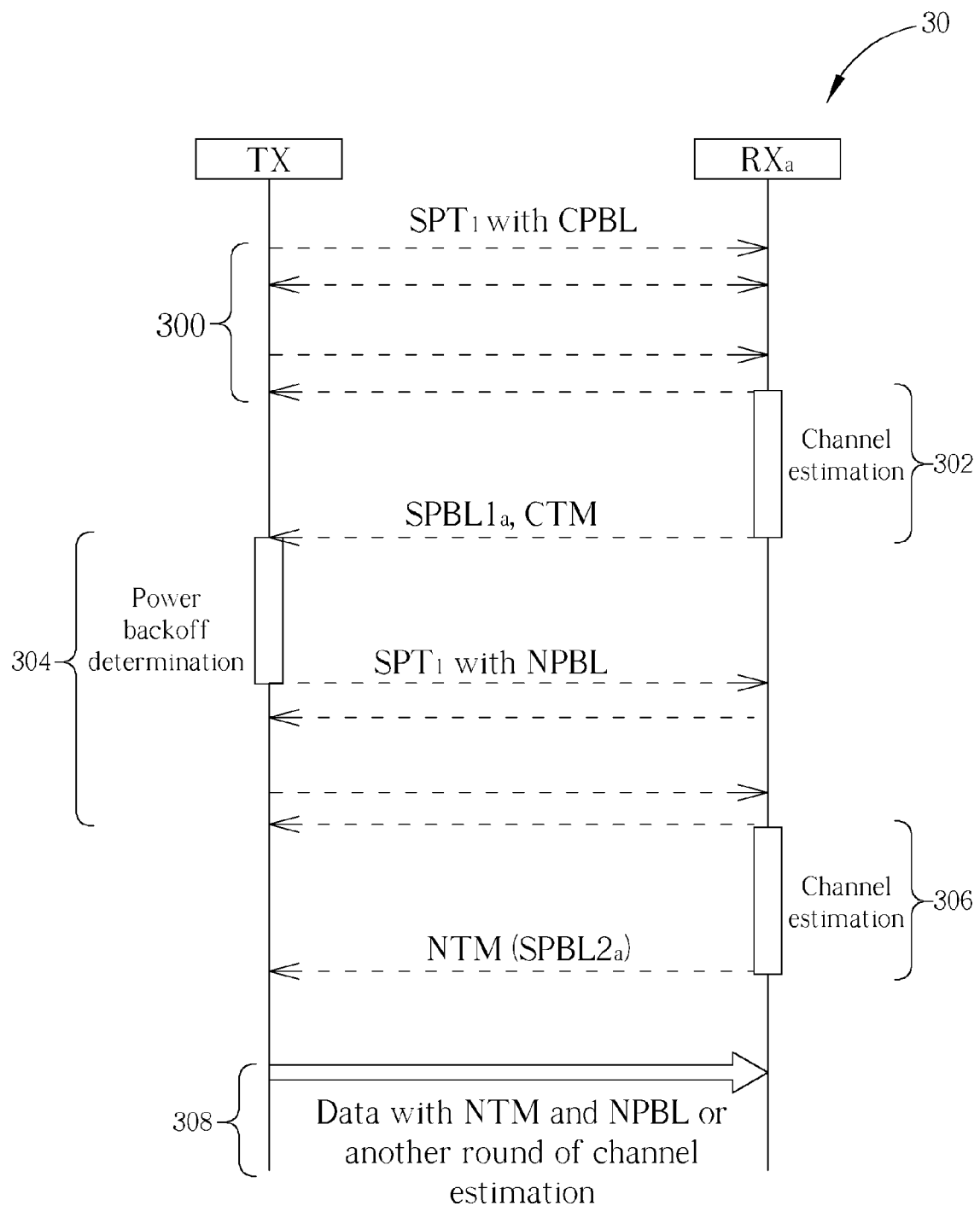
FIG. 3 is a schematic diagram of an operating sequence of a transmission power control process between a transmitter and a receiver.

For another example, please refer to FIG. 3, which is a schematic diagram of an operating sequence of a transmission power control process 30 between the transmitter TX and the receiver RX$_a$. The transmission power control process 30 includes the following steps:

Step 300: The transmitter TX initiates the sounding procedure SP$_1$ according to the current transmission power back-off level CPBL.

Step 302: The receiver RX$_a$ estimates channel and replies the suggested transmission power back-off level SPBL$1_a$.

Step 304: The transmitter TX determines the new transmission power back-off level NPBL after collecting enough channel information. The transmitter TX initiates the sounding procedure SP$_2$ according to the new transmission power back-off level NPBL if the new transmission power back-off level NPBL is different from the current transmission power back-off level CPBL.

Step 306: The receiver RX$_a$ estimates channel and replies the tone maps NTM for the new transmission power back-off level NPBL and optionally the suggested transmission power back-off level SPBL$2_a$.

Step 308: The transmitter TX utilizes the tone maps NTM for the new transmission power back-off level NPBL for continuing transmission, or reinitiates another round of sounding procedure for channel estimation if the suggested transmission power back-off level SPBL$2_a$ is different from the new transmission power back-off level NPBL.

Detail of the transmission power control processes 30 can be derived by referring to the above description.

Under such a situation, the transmission power control processes 20, 30 avoid the hidden-node problem by negotiating the new transmission power back-off level NPBL which all the receivers RX$_1$-RX$_n$ are capable to hear (e.g., detect) according to the suggested transmission power back-off levels collected from the receivers RX$_1$-RX$_n$.

However, the suggested transmission power back-off levels collected from the receivers RX$_1$-RX$_n$ indicate respective transmission power back-off levels for the receivers RX$_1$-RX$_n$ to correctly detect, i.e. demodulate, a whole packet, and it is not required for all the receivers RX$_1$-RX$_n$ to correctly demodulate the payload of those packets transmitted from the transmitter TX. For example, please continue to refer to FIG. 1E, when the station A transmits a packet to the station B, it is enough for the stations C, D and BM1 to correctly demodulate a header of the packet rather than the whole packet including a payload. Thus, since the header of the packet is more robust than the payload, the new transmission power back-off level NPBL is not optimal.

Figure 4:
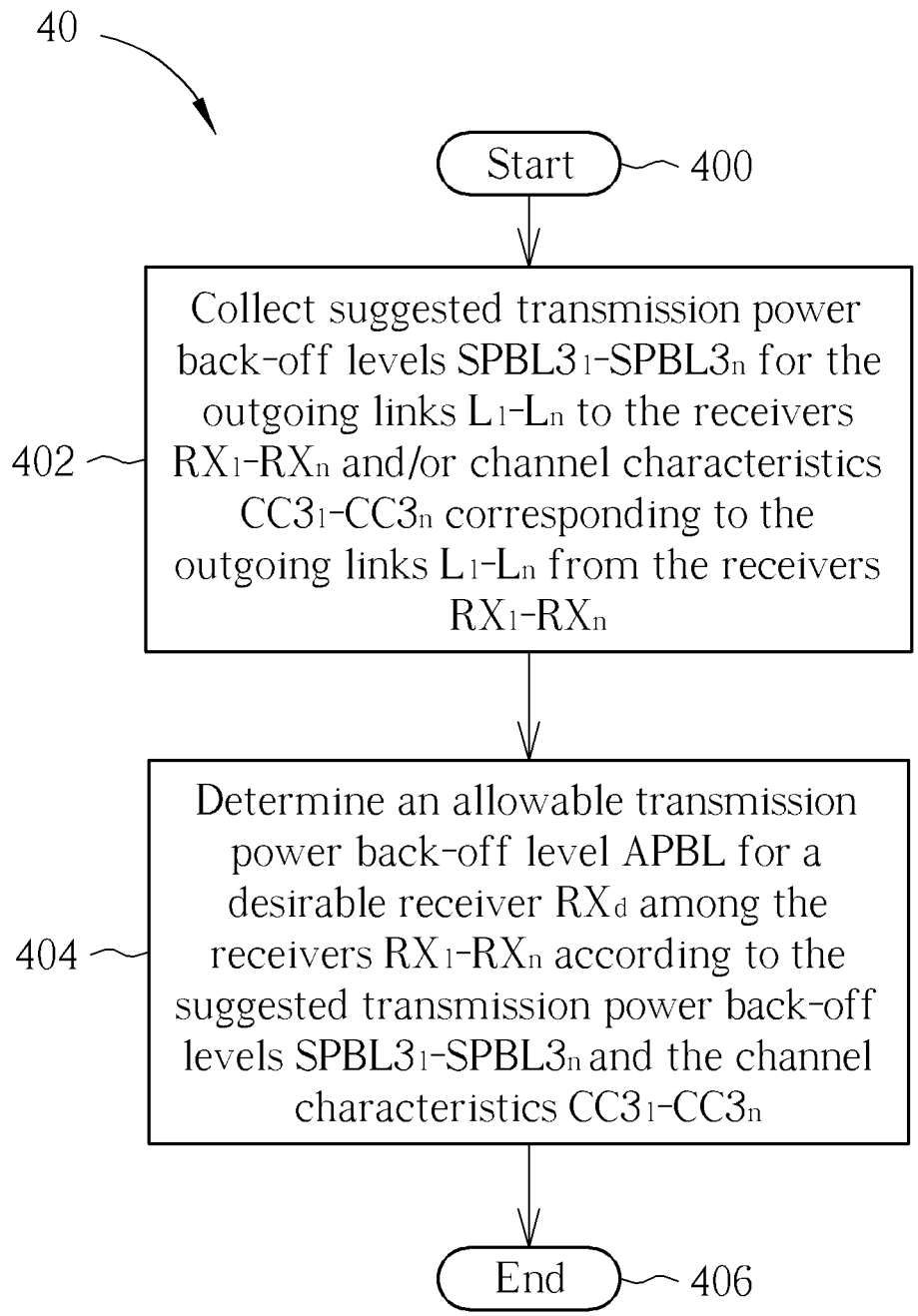
FIG. 4 is a schematic diagram of a dynamic transmission power control process for a communication system according to an embodiment of the present invention.

Therefore, please refer to FIG. 4, which is a dynamic transmission power control process 40 for a transmitter of a communication system according to an embodiment of the present invention. The communication system is preferably a PLC system, and includes a plurality of stations, e.g. the communication system is the BBS and the plurality of stations are the BSS manager BM1 and the stations A-D shown in FIG. 2. Each station in turn acts as a transmitter TX and one of receivers RX$_1$-RX$_n$ since only one station can transmit data in the PLC system at a time. The transmitter TX is coupled to the receivers RX$_1$-RX$_n$ via the corresponding outgoing links $L_1$-$L_n$. The dynamic transmission power control process 40 includes the following steps:

Step 400: Start.

Step 402: Collect suggested transmission power back-off levels SPBL$3_1$-SPBL$3_n$ for the outgoing links $L_1$-$L_n$ to the receivers RX$_1$-RX$_n$ and/or channel characteristics CC$3_1$-CC$3_n$ corresponding to the outgoing links $L_1$-$L_n$ from the receivers RX$_1$-RX$_n$.

Step 404: Determine an allowable transmission power back-off level APBL for a desirable receiver RX$_d$ among the receivers RX$_1$-RX$_n$ according to the suggested transmission power back-off levels SPBL$3_1$-SPBL$3_n$ and the channel characteristics CC$3_1$-CC$3_n$.

Step 406: End.

According to the dynamic transmission power control process 40, by operations similar to the transmission power control processes 20, 30, the transmitter TX collects suggested transmission power back-off levels SPBL$3_1$-SPBL$3_n$, e.g. similar to the suggested transmission power back-off levels SPBL$1_1$-SPBL$1_m$, SPBL$2_1$-SPBL$2_m$, and channel characteristics CC$3_1$-CC$3_n$, e.g. the channel characteristics CC$1_a$, CC$2_a$ which can include the tone maps NTM, CTM and signal to noise ratios (SNRs) information, corresponding to the outgoing links $L_1$-$L_n$ from the receivers RX$_1$-RX$_n$ first. Then, different from the transmission power control processes 20, 30, 40 determining the lowest transmission power back-off level among the suggested transmission power back-off levels SPBL$1_1$-SPBL$1_m$ as the new transmission power back-off level NPBL, the transmitter TX in the dynamic transmission power control process 40 determines an allowable transmission power back-off level APBL for a desirable receiver RX$_d$ among the receivers RX$_1$-RX$_n$ according to the suggested transmission power back-off levels SPBL$3_1$-SPBL$3_n$ and the channel characteristics CC$3_1$-CC$3_n$.

Under such a situation, when the transmitter TX transmits a packet to the desirable receiver RX$_d$ with the allowable transmission power back-off level APBL, the receivers RX$_1$-RX$_n$ can correctly detect a header of the packet, and the desirable receiver RX$_d$ can correctly detects the header and the payload of the packet. As a result, since the header of the packet is more robust than the payload of the packet, the allowable transmission power back-off level APBL can be greater than the new transmission power back-off level NPBL, the present invention can enlarge the allowable transmission power back-off level APBL for the respective desirable receiver $RX_d$ by considering the suggested transmission power back-off levels $SPBL3_1$-$SPBL3_n$ and the channel characteristics $CC3_1$-$CC3_n$ sent from the receivers $RX_1$-$RX_n$, so as to achieve better power efficiency, throughput and lower electromagnetic radiation without inducing hidden-node issue.

Figure 5:
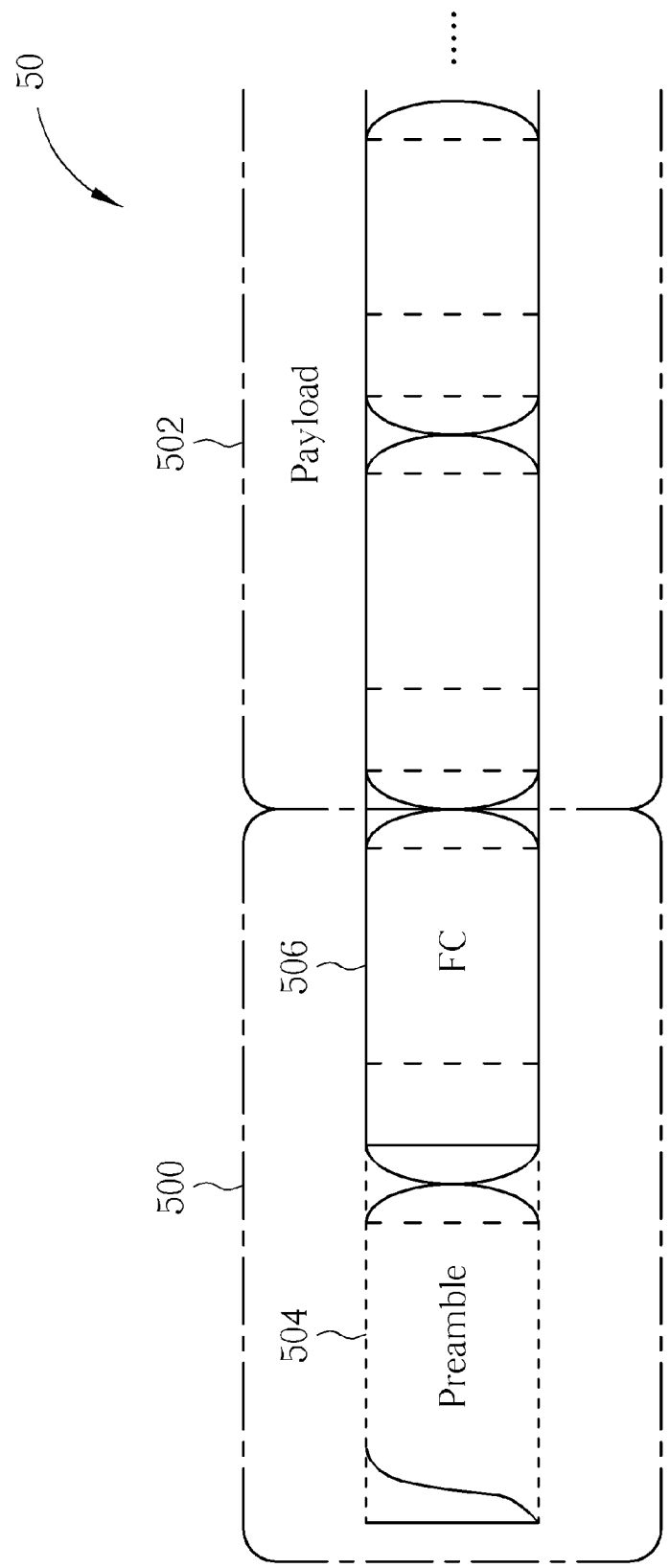
FIG. 5 is a schematic diagram of a packet of the powerline communication system according to an embodiment of the present invention.

In detail, please refer to FIG. 5, which is a schematic diagram of a packet 50 of the powerline communication system according to an embodiment of the present invention. As shown in FIG. 5, the packet 50 includes a header 500 and a payload 502, wherein the header 500 includes a preamble symbol 504 and a frame control (FC) symbol 506. The header 500 is more robust than the payload 502. For example, when a suggested transmission power back-off level responded by a receiver is −5 dB and the tone maps responded by the receiver indicate the payload 502 loaded with 6 bits and the FC symbol 506 loaded with 2 bits, the transmitter TX can send the packet 50 with a transmission power back-off level of −5−(6−2)*2=−13 dB, wherein the receiver can still detect and demodulate the header 500 of the packet 50. Under such a situation, since the header 500 indicates which receiver the packet 50 is for, it is only required for the receiver to detect and demodulate the header 500 of the packet 50 to avoid the hidden-node issue.

By the same token, the transmitter TX calculates maximum detectable power back-off levels $MDPBL_1$-$MDPBL_n$ for the receivers $RX_1$-$RX_n$ excluding the desirable receiver $RX_d$ to correctly detect the header 500 of the packet 50 according to the suggested transmission power back-off levels $SPBL3_1$-$SPBL3_n$ and the channel characteristics $CC3_1$-$CC3_n$ of the receivers $RX_1$-$RX_n$ excluding the desirable receiver $RX_d$. Then, the transmitter TX can determine the allowable transmission power back-off level APBL equal to (optimal) or lower than a lower transmission power back-off level of a suggested transmission power back-off level $SPBL3_d$ of the desirable receiver $RX_d$ and a minimum detectable power back-off level among the maximum detectable power back-off levels $MDPBL_1$-$MDPBL_n$. Under such a situation, the transmitter TX can transmit the packet 50 to the desirable receiver $RX_d$ with the allowable transmission power back-off level APBL while the receivers $RX_1$-$RX_n$ can correctly detect the header 500 of the packet 50, and the desirable receiver $RX_d$ can correctly detects the header 500 and the payload 502 of the packet 50. As a result, the present invention can enlarge the allowable transmission power back-off level APBL, to achieve better power efficiency, throughput and lower electromagnetic radiation without inducing hidden-node issue.

Figure 1A:
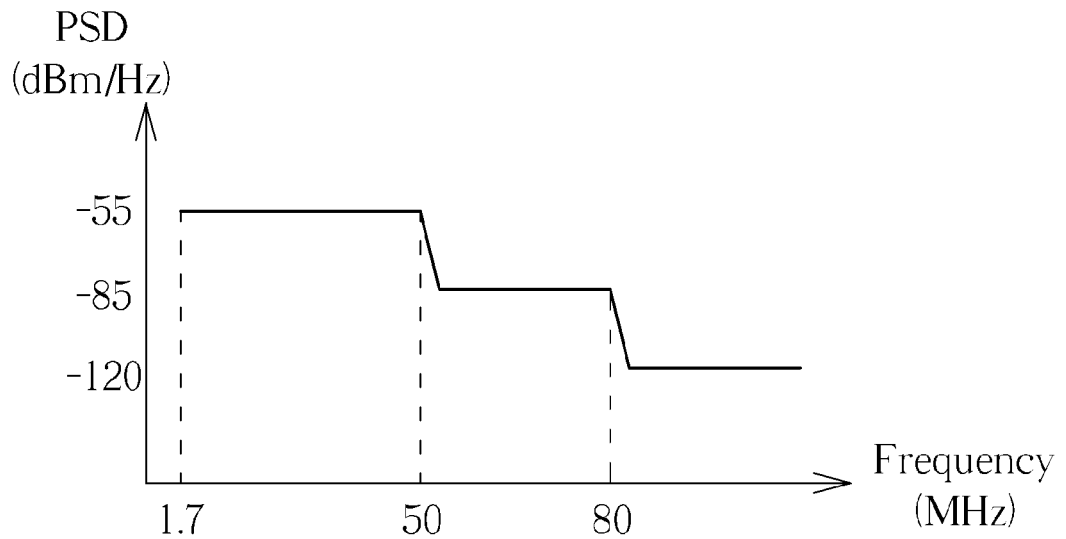
FIG. 1A is a schematic diagram of a non-flat transmit PSD mask of a powerline communication system.
Figure 1B:
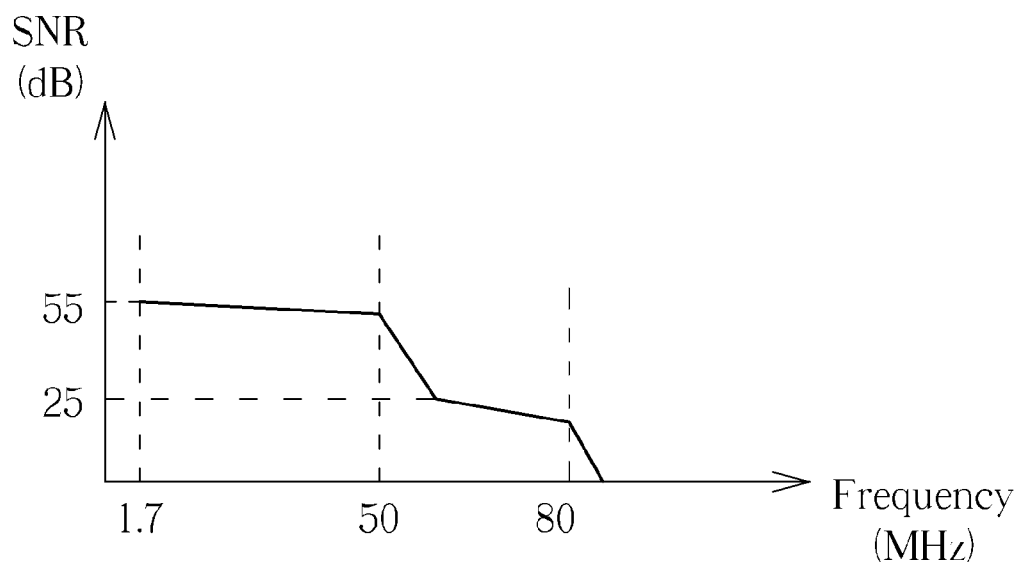
FIG. 1B is a schematic diagram of SNR of signals received by a receiver of the PLC system when utilizing the non-flat transmit PSD mask shown in FIG. 1A.
Figure 1C:
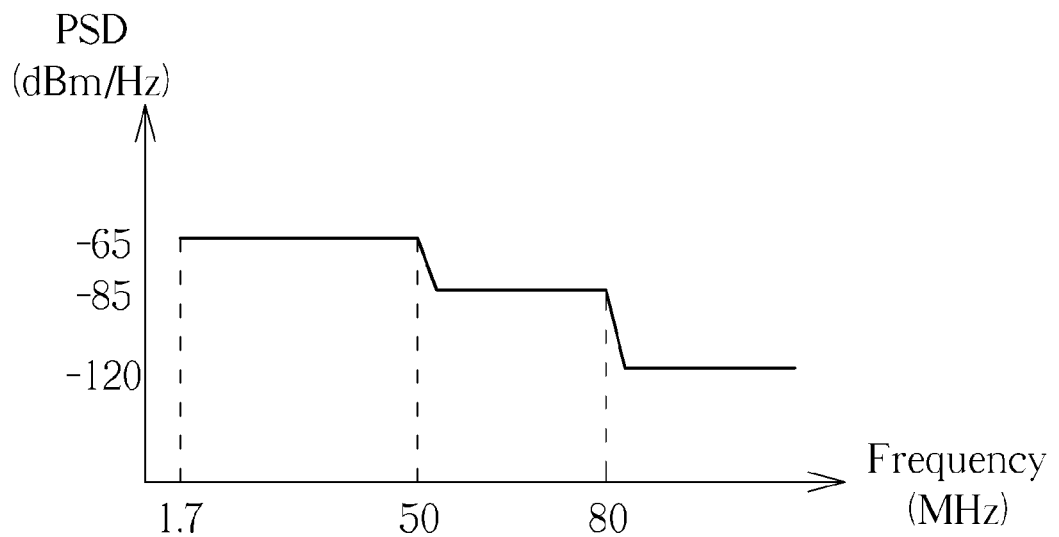
FIG. 1C is a schematic diagram of a non-flat transmit PSD mask of the PLC system applied with low-band transmission power back-off.
Figure 1D:
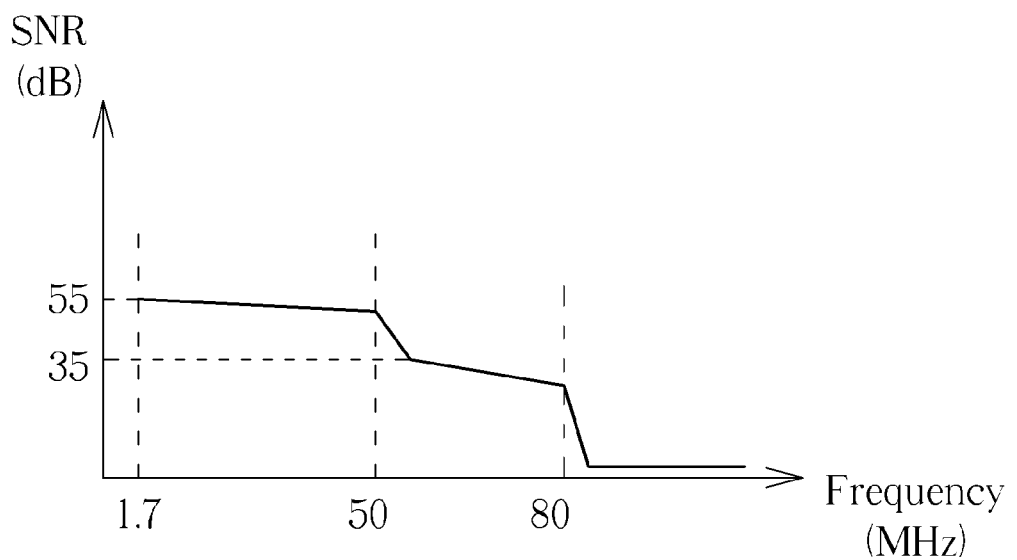
FIG. 1D is a schematic diagram of SNR of signals received by the receiver of the PLC system when utilizing the non-flat transmit PSD mask shown in FIG. 1C.
Figure 1E:
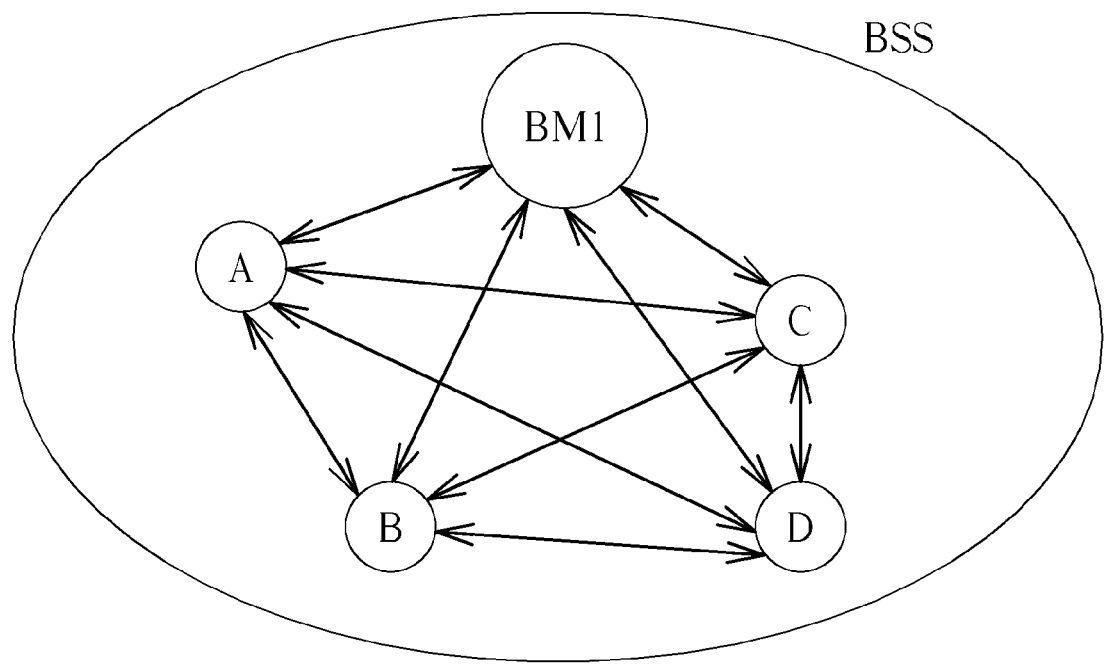
FIG. 1E is a schematic diagram of a basic service set of a powerline communication network.

For example, please continue to refer to FIG. 1E. Assume that the stations B, C, D and BM1 respond to the station with suggested transmission power back-off levels −20 dBm, −7 dBm, −5 dBm and −18 dBm and related channel characteristics. According to the transmission power control processes 20, 30, 40, the station A can determine the new transmission power back-off level NPBL as −5 dBm for all the stations B, C, D and BM1, and transmits packets to the stations B, C, D and BM1 accordingly. In comparison, according to the dynamic transmission power control process 40, the station A can determine maximum detectable power back-off levels for the stations B, C, D and BM1 as −28 dB, −15 dB, −13 dB and −26 dB (similar to the above example), and then determine allowable transmission power back-off levels for the stations B, C, D and BM1 as −13 dB, −7 dB, −5 dB and −13 dB (i.e. a lower transmission power back-off level of respective suggested transmission power back-off level of −20 dB, −7 dB, −5 dB and −18 dB and a minimum detectable power back-off level of −13 dB). As a result, the station A can transmit packets to the stations B, C, and BM1 with larger transmission power back-off level.

Noticeably, the spirit of the present invention is that the transmitter TX collects the suggested transmission power back-off levels $SPBL3_1$-$SPBL3_n$ and the channel characteristics $CC3_1$-$CC3_n$ sent from the receivers $RX_1$-$RX_n$, to determine the allowable transmission power back-off levels for respective desirable receivers, to enlarge the allowable transmission power back-off levels, so as to achieve better power efficiency, throughput and lower electromagnetic radiation without inducing hidden-node issue. Those skilled in the art should make modifications or alterations accordingly. For example, the transmission power control process 40 is preferably applied in a PLC system, but can be applied in other communication system with a hidden terminal problem. Besides, the packet 50 is not limited to the format shown in FIG. 5, the frame control 506 can be combined into the preamble 504 in a short delimiter case.

Moreover, the allowable transmission power back-off level APBL can include an allowable header transmission power back-off level and an allowable payload transmission power back-off level. Under such a situation, the transmitter TX can transmit the header 500 of the packet 50 with the allowable header transmission power back-off level and the payload 502 of the packet with the allowable payload transmission power back-off level, wherein the allowable header transmission power back-off level is equal to (optimal) or lower than a minimum detectable power back-off level among the maximum detectable power back-off levels $MDPBL_1$-$MDPBL_n$, and the allowable payload transmission power back-off level is equal to (optimal) or lower than the suggested transmission power back-off level $SPBL3_d$ of the desirable receiver $RX_d$.

For example, please continue to refer to FIG. 1E. With the same condition as the above example, i.e. the suggested transmission power back-off levels for the stations B, C, D and BM1 are −20 dB, −7 dB, −5 dBm and −18 dB, and the maximum detectable power back-off levels for the stations B, C, D and BM1 are −28 dB, −15 dB, −13 dB and −26 dB, the station A can determine the allowable header transmission power back-off levels for the stations B, C, D and BM1 as −13 dBm (a minimum detectable power back-off level among −28 dB, −15 dB, −13 dB and −26 dBdBm), and the allowable payload transmission power back-off levels for the stations B, C, D and BM1 as −20 dBm, −7 dBm, −5 dBm and −18 dBm. As a result, the station A can transmit packets to the stations B, C, D and BM1 with further larger transmission power back-off level.

In the prior art, careless transmission power back-off may result in the hidden-node problem that an on-going packet may be interfered by some distant nodes which can not hear the signal from the packet transmitter. Besides, since it is not required for all the receivers $RX_1$-$RX_n$ to correctly demodulate the payload of those packets transmitted from the transmitter TX, determining the transmission power back-off level just according to suggested transmission power back-off levels for the receivers $RX_1$-$RX_n$ to correctly demodulate the whole packet is not optimal.

In comparison, the present invention collects the suggested transmission power back-off levels $SPBL3_1$-$SPBL3_n$ and the channel characteristics $CC3_1$-$CC3_n$ sent from the receivers $RX_1$-$RX_n$, to determine the allowable transmission power back-off levels for respective desirable receivers, wherein the receivers $RX_1$-$RX_n$ can correctly detect a header of the packet, and the desirable receiver $RX_d$ can correctly detects the header and the payload of the packet. Therefore, the present invention can further enlarge the allowable transmission power back-off levels, so as to achieve better power efficiency, throughput and lower electromagnetic radiation without inducing hidden-node issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic transmission power control method for a transmitter of a communication system which comprises the transmitter and a plurality of receivers, the transmitter coupled to the plurality of receivers via a plurality of corresponding outgoing links, the transmission power control method comprising:

collecting a plurality of suggested transmission power back-off levels for the plurality of outgoing links to the plurality of receivers and/or a plurality of channel characteristics corresponding to the plurality of outgoing links from the plurality of receivers; and determining an allowable transmission power back-off level for a desirable receiver among the plurality of receivers according to the plurality of suggested transmission power back-off levels and the plurality of channel characteristics.

2. The transmission power control method of claim 1 further comprising:

transmitting a packet to the desirable receiver with the allowable transmission power back-off level;

wherein the plurality of receivers correctly detect a header of the packet, and the desirable receiver correctly detects the header and the payload of the packet.

3. The transmission power control method of claim 2, wherein the header comprises a preamble symbol and a frame control (FC) symbol.

4. The transmission power control method of claim 2, wherein the step of determining the allowable transmission power back-off level for the desirable receiver among the receivers according to the plurality of suggested transmission power back-off levels and the plurality of channel characteristics comprises:

calculating a plurality of maximum detectable power back-off levels for the plurality of receivers excluding the desirable receiver to correctly detect the header of the packet according to the plurality of suggested transmission power back-off levels and the plurality of channel characteristics of the plurality of receivers excluding the desirable receiver.

5. The transmission power control method of claim 4, wherein the step of determining the allowable transmission power back-off level for the desirable receiver among the receivers according to the plurality of suggested transmission power back-off levels and the plurality of channel characteristics further comprises:

determining the allowable transmission power back-off level equal to or lower than a lower transmission power back-off level of a suggested transmission power back-off level of the desirable receiver and a minimum detectable power back-off level among the plurality of maximum detectable power back-off levels.

6. The transmission power control method of claim 2, wherein the allowable transmission power back-off level comprises an allowable header transmission power back-off level and an allowable payload transmission power back-off level.

7. The transmission power control method of claim 6 further comprising:

transmitting the header of the packet with the allowable header transmission power back-off level and the payload of the packet with the allowable payload transmission power back-off level.

8. The transmission power control method of claim 6, wherein the allowable header transmission power back-off level is equal to or lower than a minimum detectable power back-off level among a plurality of maximum detectable power back-off levels for the plurality of receivers to correctly detect the header of the packet, and the allowable payload transmission power back-off level is equal to or lower than a suggested transmission power back-off level of the desirable receiver.

9. The transmission power control method of claim 1, wherein the communication system is a powerline communication (PLC) system.

* * * * *